United States Patent [19]

Haaf et al.

[11] 4,442,251
[45] Apr. 10, 1984

[54] IMPACT RESISTANT POLYPHENYLENE ETHER RESIN COMPOSITIONS

[75] Inventors: William R. Haaf, Voorheesville; Gim F. Lee, Jr., Albany; Sei P. Ting, Delmar, all of N.Y.

[73] Assignee: General Electric Company, Pittsfield, Mass.

[21] Appl. No.: 354,894

[22] Filed: Mar. 4, 1982

[51] Int. Cl.³ .................... C08K 5/52; C08L 71/04
[52] U.S. Cl. .................... 524/141; 525/68; 525/132
[58] Field of Search .................. 524/141; 525/68, 132, 525/227, 308

[56] References Cited

U.S. PATENT DOCUMENTS

| | | | |
|---|---|---|---|
| 2,834,746 | 5/1958 | Salyer et al. | 525/240 |
| 3,230,186 | 1/1966 | Kreibich et al. | 525/227 |
| 3,361,851 | 1/1968 | Gowan | 525/132 |
| 3,383,435 | 5/1968 | Cizek | 525/132 |
| 3,446,760 | 5/1969 | Nowak et al. | 525/227 |
| 3,786,105 | 1/1974 | Nakashio et al. | 525/132 |
| 3,792,123 | 2/1974 | Abolins et al. | 525/68 |
| 3,794,606 | 2/1974 | Bennett et al. | 525/68 |
| 3,833,687 | 9/1974 | Lee, Jr. | 525/68 |
| 3,833,688 | 9/1974 | Abolins et al. | 525/68 |
| 3,959,211 | 5/1976 | Cooper et al. | 525/68 |
| 4,113,797 | 9/1978 | Lee, Jr. | 525/68 |
| 4,131,598 | 12/1978 | Abolins et al. | 525/68 |
| 4,132,684 | 1/1979 | Izawa et al. | 525/68 |
| 4,226,950 | 10/1980 | Holub et al. | 525/68 |
| 4,282,139 | 8/1981 | Sugio et al. | 525/132 |
| 4,299,757 | 11/1981 | Kuribayashi et al. | 525/68 |
| 4,311,633 | 1/1982 | Lee, Jr. | 525/68 |
| 4,315,084 | 2/1982 | Cooper et al. | 525/68 |
| 4,367,311 | 1/1983 | Brandstetter et al. | 525/68 |

Primary Examiner—Lorenzo B. Hayes
Assistant Examiner—R. A. White
Attorney, Agent, or Firm—Hedman, Gibson, Costigan & Hoare

[57] ABSTRACT

Compositions of polyphenylene ether resin, optionally containing an impact modifier are modified by incorporation of small amounts of a copolymer of ethylene and methyl acrylate. The resultant blends are moldable into articles having better Gardner (falling dart) impact strength than corresponding compositions similarly modified with low density polyethylene, without detriment to other important physical properties of the compositions.

8 Claims, No Drawings

IMPACT RESISTANT POLYPHENYLENE ETHER RESIN COMPOSITIONS

BACKGROUND OF THE INVENTION

The polyphenylene ether resins constitute a family of high performance engineering thermoplastics possessing outstanding properties which makes them useful and desirable for many applications. These materials and methods for their preparation are described in many publications, including U.S. Pat. Nos. 3,306,874 and 3,306,875 to Allan Hay, and U.S. Pat. Nos. 3,257,357 and 3,257,358 to Gelu Stamatoff.

The polyphenylene ether resins are admixable with rubber modified high impact polystyrene to form blends which can be molded into articles having improved impact strength.

It is known that additional properties of polyphenylene ether resins and blends can be materially upgraded by blending them with certain other polymeric materials. Polyphenylene ether resins alone, when molded, are somewhat brittle and may shatter or fracture upon impact. Also, the relatively high melt viscosity and softening point of the polymer can cause difficulty in processing.

It has been found that polyolefin resins, such as low density polyethylene, can be incorporated in polyphenylene ether resin blends to lower the melt viscosity of the polyphenylene ether and to improve the melt flow. Compositions of this type are disclosed by Lee, Jr. in U.S. Pat. No. 4,166,055. This same additive, in relatively small amounts, is also known to function as an impact modifier, external lubricant and mold release agent for the blends.

INTRODUCTION TO THE INVENTION

The discovery has now been made that copolymers of ethylene and methyl acrylate can be incorporated with blends of polyphenylene ether resin and rubber modified high impact polystyrene to provide compositions possessing better Gardner impact strength improvement than corresponding blends modified with low density polyethylene. Moreover, this improvement is accomplished while maintaining essentially equivalent other important physical properties of the compositions.

DESCRIPTION OF THE INVENTION

The polyphenylene oxide resins useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are homo- and copolymers of the formula:

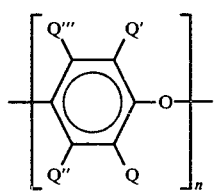

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The polyphenylene ether resin may be prepared by well known procedures, such as those described in the previously mentioned patents.

The polyphenylene ether resin is preferably but not necessarily in admixture with one or more polymeric impact modifiers. The impact modifier can be a styrene homopolymer in admixture or otherwise modified with an elastomeric material such as a natural or synthetic rubber, or a styrene containing elastomeric copolymer or terpolymer.

By way of illustration, the impact modifier may be a homopolymer such as polystyrene, polychlorostyrene, poly(alpha-methyl styrene), poly(para-methyl styrene), which has been modified by natural or synthetic rubber, for example, polybutadiene, polyisoprene, butyl rubber, EPDM rubber, natural rubber, polysulfide rubbers, polyurethane rubbers, etc., elastomeric styrene copolymers such as styrene-butadiene copolymers and styrene-maleic anhydride copolymers, styrene-acrylonitrilebutadiene terpolymers (ABS), block copolymers of styrene and a diene in their various forms, for example, A-B, A-B-A, A-B-AB, A-B-A-B-A, etc., random or radial teleblock copolymers of these same materials, as well as hydrogenated forms of the linear, random or radial copolymers in which the aliphatic unsaturation, e.g., of the "B" (diene) block has been reduced; and admixtures of any of the above mentioned styrene homopolymers with any of the above mentioned elastomeric styrene co- and terpolymers.

As indicated previously, the compositions contain a copolymer of ethylene and methyl acrylate. Preferably the copolymer will have a methyl acrylate content of from about 10 to 25% by weight. Such copolymers are available commercially, e.g., from Gulf Chemicals under the trade designation PE-2205 and TD938-70.

The compositions may be formulated to contain the polyphenylene ether resin and styrene polymer in widely ranging proportions, for instance, with a weight ratio of 20:1 to 1:20, especially 4:1 to 1:2. The ethylene-methyl acrylate copolymer need be present in only small amounts to be effective, with about 0.1 to 5 parts by weight of the polyphenylene ether and polystyrene combined being typical.

The compositions can also contain supplementary non-resinous additives customarily employed in polyphenylene ether molding compositions to improve other physical and chemical properties. The additives include flame retardants, plasticizers, strengthening fibers (for example, glass filaments and graphite whiskers), antioxidants, mold release agents, mineral fillers, pigments, dyes, abrasion resistant components, etc. These are typically included in minor but effective amounts of between 1% and 50% by weight of the total composition.

Preparation of the compositions is accomplished by use of any of the known procedures for polyphenylene ether molding compositions, e.g., such as described in U.S. Pat. No. 4,166,055. Preferably, the ingredients are formed into a blend pre-mix, extruded as on a single or twin screw extruder, cooled, chopped or ground into molding pellets and injection molded into articles of the desired shape and size.

The following examples are presented as an illustration of the invention. These are intended as specific embodiments only and not as a limitation on the scope of the invention. Proportions are stated in parts by weight.

EXAMPLES

Blends were prepared by tumbling 55 parts of poly(2,6-dimethyl-1,4-phenylene ether) resin (PPO®, General Electric Co.), 45 parts of rubber modified high impact polystyrene (Foster Grant's 834, containing about 9% polybutadiene rubber), 1.5 parts of ethylene-methyl acrylate copolymer, 1.0 part of diphenyl decyl phosphite, 3.5 parts of isopropylated triphenyl phosphate flame retardant (FMC's Kronitex®50), 0.15 part of zinc oxide and 0.15 part of zinc sulfide. The blend pre-mixes were extruded on a 28 mm Werner Pfeiderer twin screw extruder at a temperature of 570° F., cooled, chopped into pellets and injection molded at 540° F., (180° F. mold temperature) into test bars.

For comparison purposes, a corresponding composition containing low density polyethylene (Rexene®126), instead of ethylene-methyl acrylate copolymer, was also prepared, as was a control blend not containing either additive. The results are shown in the Table below.

The above mentioned patents and/or publications are incorporated herein by reference. Obviously, other modifications and variations are possible in light of the above disclosure. For instance, instead of poly(2,6-dimethyl-1,4-phenylene ether), copolymers such as poly(2,6-dimethyl-co-2,3,6-trimethyl-1,4-phenylene ether) can be substituted. It is to be understood, therefore, that changes may be made in the particular embodiments shown which are within the full intended scope of the invention as defined in the appended claims.

We claim:

1. A thermoplastic composition, comprising an admixture of:
   (a) a blend of a polyphenylene ether resin and a rubber modified high impact polystyrene; and
   (b) an impact strength enhancing amount of a copolymer of ethylene and methyl acrylate.

2. A composition according to claim 1, in which the polyphenylene ether is poly(2,6-dimethyl-1,4-phenylene ether).

3. A composition according to claim 1, in which the ethylene-methyl acrylate copolymer has a methyl acrylate content of from about 10 to 25% by weight.

4. A composition according to claim 1, in which the polyphenylene ether resin and the rubber modified high impact polystyrene are present in a weight ratio between 20:1 and 1:20.

5. A composition according to claim 4, in which the polyphenylene ether resin and the rubber modified high impact polystyrene are present in a weight ratio between 4:1 and 1:2.

6. A composition according to claim 1, which contains from about 0.1 to 5 parts by weight of the ethylene-methyl acrylate copolymer, based on 100 parts of

TABLE

| Sample No. | Additive | HDT (°F.) | Izod imp. str. (ft.lbs./in.n.) | Gardner imp. str. (in.-lbs.) | Melt Visc. at 282° C. 1500 sec.$^{-1}$ | Tensile strength (psi) |
|---|---|---|---|---|---|---|
| Control | — | 252 | 2.1 | 60 | 2800 | 8900 |
| 1* | Rexene 126 | 253 | 2.6 | 96 | 2900 | 8900 |
| 2 | PE-2205** | 252 | 2.8 | 144 | 2900 | 9300 |
| 3 | TD 938-70** | 252 | 2.6 | 120 | 2900 | 9300 |

| Sample No. | Tensile yield (psi) | Tensile elongation (%) | Flexural modulus (psi) | Flexural strength (psi) | Flow channel length (inches) |
|---|---|---|---|---|---|
| Control | 10,600 | 51 | 381,000 | 15,300 | 12.5 |
| 1 | 10,500 | 58 | 397,000 | 15,000 | 13 |
| 2 | 10,400 | 72 | 381,000 | 14,500 | 13.25 |
| 3 | 10,400 | 67 | 415,000 | 15,200 | 12.5 |

*comparison experiment
**ethylene-methyl acrylate copolymer containing 20% by weight of methyl acrylate It can be seen that at the same concentration in the composition, the ethylene-methyl acrylate copolymer results in a considerably greater Gardner impact strength improvement in comparison with the low density polyethylene. The other physical properties shown are not adversely affected by use of the copolymer.

the polyphenylene ether and rubber modified high impact polystyrene combined.

7. A composition according to claim 1, which includes a flame retardant amount of a flame retardant agent.

8. A composition according to claim 7, in which the flame retardant agent is triphenyl phosphate.

* * * * *